UNITED STATES PATENT OFFICE 2,424,652

POLYHYDRIC ALCOHOL ESTERS OF PHENOXYACETOXYACETIC ACID

Maurice Leon Ernsberger and Paul Swithin Pinkney, Wilmington, Del., assignors to E. I. du Pont de Nemours & Company, Wilmington, Del., a corporation of Delaware No Drawing. Application July 22, 1943, Serial No. 495,770

2 Claims. (Cl. 260—473)

This invention relates to a new class of organic esters. More particularly, it relates to a specific type of organic esters particularly suitable for use as cellulose derivative plasticizers.

Many plasticizers for organic esters of cellulose are known, but few meet either of two important requirements, viz., compatibility at the high concentration required for good pliability, and satisfactory resistance to extraction by water. None, to our knowledge, meets both requirements.

It is an object of this invention to provide a new class of organic esters. Another object is to provide a class of compounds possessing outstanding properties as plasticizers for cellulose esters. A further object comprises cellulose ester compositions plasticized with the esters of this invention. Other objects will appear hereinafter.

These objects are accomplished by the invention of aliphatic polyhydric alcohol esters in which at least one of the hydroxyl groups of the polyhydric alcohol is esterified with a hydroxymonocarboxylic, preferably aliphatic, acid itself esterified with an aryloxymonocarboxylic acid, preferably an aryloxy aliphatic monocarboxylic acid, and of cellulose ester compositions plasticized with these esters.

The invention is illustrated by the following examples describing the preparation and use of a representative member of the class, ethylene glycol bis-(phenoxyacetoxy) acetate, a compound having the formula

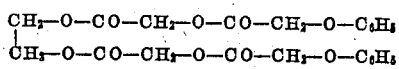

The term "parts" in the examples signifies "parts by weight."

Example I

A mixture of 124 parts of ethylene glycol (2 moles) and 362 parts of methyl glycolate (4 moles) is heated in the presence of 5 parts of litharge in a still fitted with an efficient fractionating column to separate the methanol formed by ester interchange. The reaction mixture is heated first at atmospheric pressure and then at a pressure of 150 mm. of mercury until all the methanol formed in the reaction has been removed. A pot temperature of 132–205° C. is used for the reaction at atmospheric pressure, and a temperature of 75–190° C. is used for the portion of the reaction carried out at reduced pressure. The litharge is then filtered from the reaction mixture and to the filtrate is added 608 parts of phenoxyacetic acid (4 moles), 315 parts of ethylene dichloride, and 10 parts of p-toluenesulfonic acid. This mixture is then heated at a reaction temperature of 107–126° C. in a still fitted with an efficient fractionating column until all the water formed in the reaction has been removed. The ethylene dichloride, which serves as a carrier for the water, is returned to the reaction mixture through an automatic separator. The crude reaction mixture is then washed with dilute sodium carbonate solution and water and refined by the following procedure: The washed ester is heated in the presence of 20 parts of decolorizing carbon at a temperature of 100° C./50 mm. pressure until excess ethylene dichloride has been removed, and the ester is then steam distilled for 25 minutes at 90–100° C./350 mm. pressure. The ester is finally dried by further heating at 90–105° C./40 mm., and then filtered. The product, amounting to 708 parts, is a very viscous, amber colored liquid which solidified on standing at room temperature. It has a saponification number of 496. Calcd. for $C_{22}H_{22}O_{10}$ sap. No.=502.

In place of ethylene glycol, any monomeric polyhydric alcohol may be used, including propylene glycol, butylene glycol, glycerol, erythritol, the distillable polyalkylene glycols, etc. Other monocarboxylic hydroxy acids, such as lactic acid, beta-hydroxypropionic acid, apha, beta and gamma hydroxybutyric acids, etc., in the form of their esters with voatile alcohols such as methanol, may be used in place of methyl glycolate. Suitable aryloxy monocarboxylic acids include alpha and beta-phenoxypropionic acids, the phenoxy- and naphthoxybutyric acids, etc.

In addition to the preparative method described in the above example, which involves an ester interchange reaction, it is possible to prepare esters of this type by esterifying the hydroxy acid with the aliphatic polyhydric alcohol by usual esterification methods and then further esterifying the hydroxyl group of the hydroxy acid ester with the aryloxycarboxylic acid. Conversely, the hydroxy acid may first be esterified with the aryloxycarboxylic acid, and the resulting acid used to esterify the polyhydric alcohol.

At least one of the hydroxyl groups of the polyhydric alcohol should be esterified. Preferably, all of them are esterified.

The use of the esters of this invention in the plasticization of cellulose esters is shown in the following example.

Example II

A solution of 12 parts of cellulose acetate of about 57% combined acetic acid content and 14.5 parts of ethylene glycol bis-phenoxyacetoxyacetate in 59 parts of acetone is prepared. A film is cast by spreading this solution on a suitable support and evaporating the solvent. After the film is substantially dry, it is seasoned for 8 hours at 55° C. The resulting film, 0.005" thick, loses only 0.8% of its weight by immersion in water for 6 hours at 25° C. In comparison, a film of the same type of cellulose acetate plasticized with 50 parts of ethylene glycol bis-acetoxyacetate per 50 parts of cellulose acetate loses 24% of its weight on immersion in water for 6 hours at 25° C.

The plasticizers of this invention are of outstanding advantage for use with cellulose esters of organic acids particularly cellulose acetate but may also be employed with cellulose esters, including mixed esters in general.

The use of ethylene glycol bis-phenoxyacetoxyacetate in cellulose acetate compositions suitable for use as photographic film base is illustrated by the following example:

*Example III*

A film 0.005" thick is prepared by casting a solution of 20 parts of cellulose acetate of 56% combined acetic acid content, 5 parts of ethylene glycol bis-phenoxyacetoxyacetate, and 114 parts of acetone on a suitable support and removing the solvent by evaporation. The resulting films have improved resistance to water in comparison with similar films plasticized with the commercially used triphenyl phosphate. The film plasticized with glycol bis-phenoxyacetoxyacetate absorbs only 3.9% water (average of amounts absorbed after 25 and 50 minutes immersion in water at 25° C.). A similar film plasticized with the same proportion of tri-phenyl phosphate has a water absorption value of 4.7% under the same conditions.

The films of this invention, when coated, with a light sensitive silver halide gelatin emulsion have improved dimensional stability on exposure to aqueous processing baths.

The above description and examples are intended to be illustrative only. Any modification of or variation therefrom which conforms to the spirit of the invention is intended to be included within the scope of the claims.

We claim:

1. Ethylene glycol bis-phenoxyacetoxyacetate.
2. An ester of a distillable polyhydric alcohol of the class consisting of ethylene, propylene, and butylene glycols, glycerol, erythritol, and the distillable polyalkylene glycols in which all the hydroxyl groups of the polyhydric alcohol are replaced by the radical of phenoxyacetoxyacetic acid.

MAURICE LEON ERNSBERGER.
PAUL SWITHIN PINKNEY.

REFERENCES CITED

The following references are of record in the file of this patent:

UNITED STATES PATENTS

| Number | Name | Date |
| --- | --- | --- |
| 2,142,126 | Grether | Jan. 3, 1939 |
| 2,170,996 | Grether | Aug. 29, 1937 |
| 2,234,706 | Normington et al. | Mar. 11, 1941 |
| 1,808,998 | Sheppard et al. | June 9, 1931 |
| 1,929,290 | Schmidt | Oct. 3, 1933 |
| 2,170,995 | Grether et al. | Aug. 29, 1939 |
| 2,158,107 | Carruthers et al. | May 16, 1939 |